United States Patent
Chen et al.

(10) Patent No.: US 7,628,092 B2
(45) Date of Patent: Dec. 8, 2009

(54) GEARSHIFT LOCK PROTECTION MECHANISM

(75) Inventors: Jhih-Chao Chen, Douliu (TW);
Shen-Fa Ho, Changhua (TW);
Ting-Shun Wu, Yuanlin Town (TW);
Chih-An Huang, Yuanlin Township (TW)

(73) Assignee: Motive Power Industry Co., Ltd. (TW)

( * ) Notice: Subject to any disclaimer, the term of this patent is extended or adjusted under 35 U.S.C. 154(b) by 373 days.

(21) Appl. No.: 11/624,245

(22) Filed: Jan. 18, 2007

(65) Prior Publication Data

US 2008/0173118 A1 Jul. 24, 2008

(51) Int. Cl.
*B60K 20/00* (2006.01)
(52) U.S. Cl. ................ 74/473.23; 74/473.25; 74/473.26
(58) Field of Classification Search ............... 74/473.21, 74/473.22, 473.23, 473.24, 473.25, 473.26; 192/220.2, 220.4
See application file for complete search history.

(56) References Cited

U.S. PATENT DOCUMENTS

| | | | |
|---|---|---|---|
| 4,473,141 A * | 9/1984 | Mochida ...................... | 477/94 |
| 5,176,231 A * | 1/1993 | Moody et al. ............ | 192/220.2 |
| 6,311,577 B1 * | 11/2001 | Worner et al. ............ | 74/473.21 |
| 6,533,705 B1 * | 3/2003 | Giefer et al. ................... | 477/96 |
| 2004/0069088 A1 * | 4/2004 | Meyer ...................... | 74/473.23 |
| 2008/0045381 A1 * | 2/2008 | Vermeersch et al. .......... | 477/99 |

* cited by examiner

*Primary Examiner*—David M Fenstermacher
(74) *Attorney, Agent, or Firm*—Schmeiser, Olsen & Watts

(57) ABSTRACT

Disclosed herein is a gearshift lock protection mechanism including a gearbox, a gearshift module and a gearshift lock controller. The gearshift module includes a control panel and a gearshift leading wire set. The control panel is combined with a gearbox shaft of the gearbox, shifting gears of the gearbox by using the gearshift leading wire set to control the control panel and the gearbox shaft. Furthermore, a plurality of gear ranges positioning holes are located on the surface of the control panel. The gearshift lock controller includes a control valve which is linked to a gearshift poisoning leading wire, a positioning terminal located at the end of the gearshift positioning leading wire which is in one of the gear ranges positioning holes determined by the control valve, such that it can lock the gear in a particular range and eliminate the gearbox damage.

5 Claims, 4 Drawing Sheets

GEARSHIFT LOCK PROTECTION MECHANISM

BACKGROUND OF THE INVENTION

1. Field of the Invention

The invention relates to a gearshift mechanism. In particular, this novel gearshift mechanism features gearshift lock protection and failure reduction.

2. Description of the Related Art

Most vehicles have at least two gear ranges, which are the forward range and the reverse range. Moreover, they have the neutral range and the parking range. An over-sand vehicle has fewer gear ranges, namely, forward range, normal range and reverse range. The gearshift must be shifted to the forward range while the over-sand vehicle is running forward. Damage to the gearbox occurs when the gear is shifted from the forward range to the reverse range suddenly. This may happen either when the vehicle is moving on a bumpy road or when the driver is performing unconventional motions and thus accidentally touches the gearshift lever. Moreover, if this accidental gearshift occurs in a vehicle with a plurality of forward gear ranges such as high speed forward range, middle speed forward range and low speed forward range, the gear goes through rapidly shifts among forward ranges of different speeds. The unpredictable gear shifts also cause damage to the gearbox.

SUMMARY OF THE INVENTION

As described above, damage to the gearbox occurs when the gear is shifted unpredictably among ranges of different moving-modes or of different speed. An object of the present invention is to provide protection to the gearshift and eliminate gearbox damage by locking the gear in a particular range.

The gearshift lock protection mechanism of the present invention comprises a gearbox, a gearshift module and a gearshift lock controller, the gearshift module comprises a control panel and a gearshift leading wire set, the control panel is combined with a gearbox shaft of the gearbox, shifting gears of the gearbox by using the gearshift leading wire set to control the control panel and the gearbox shaft, wherein, A plurality of gear ranges positioning holes which are located on the surface of the control panel, the gearshift lock controller comprises a control valve which is linked to a gearshift poisoning leading wire, a positioning terminal located at the end of the gearshift positioning leading wire which is in one of the gear ranges positioning holes determined by the control valve, such that it can lock the gear in a particular range and eliminate the gearbox damage.

Both the forgoing general description and the following detailed description are exemplary and explanatory only and are not restrictive of the invention, as claimed

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the invention. In the drawings.

DETAILED DESCRIPTION OF THE PREFERRED EMBODIMENTS

Figure 1:
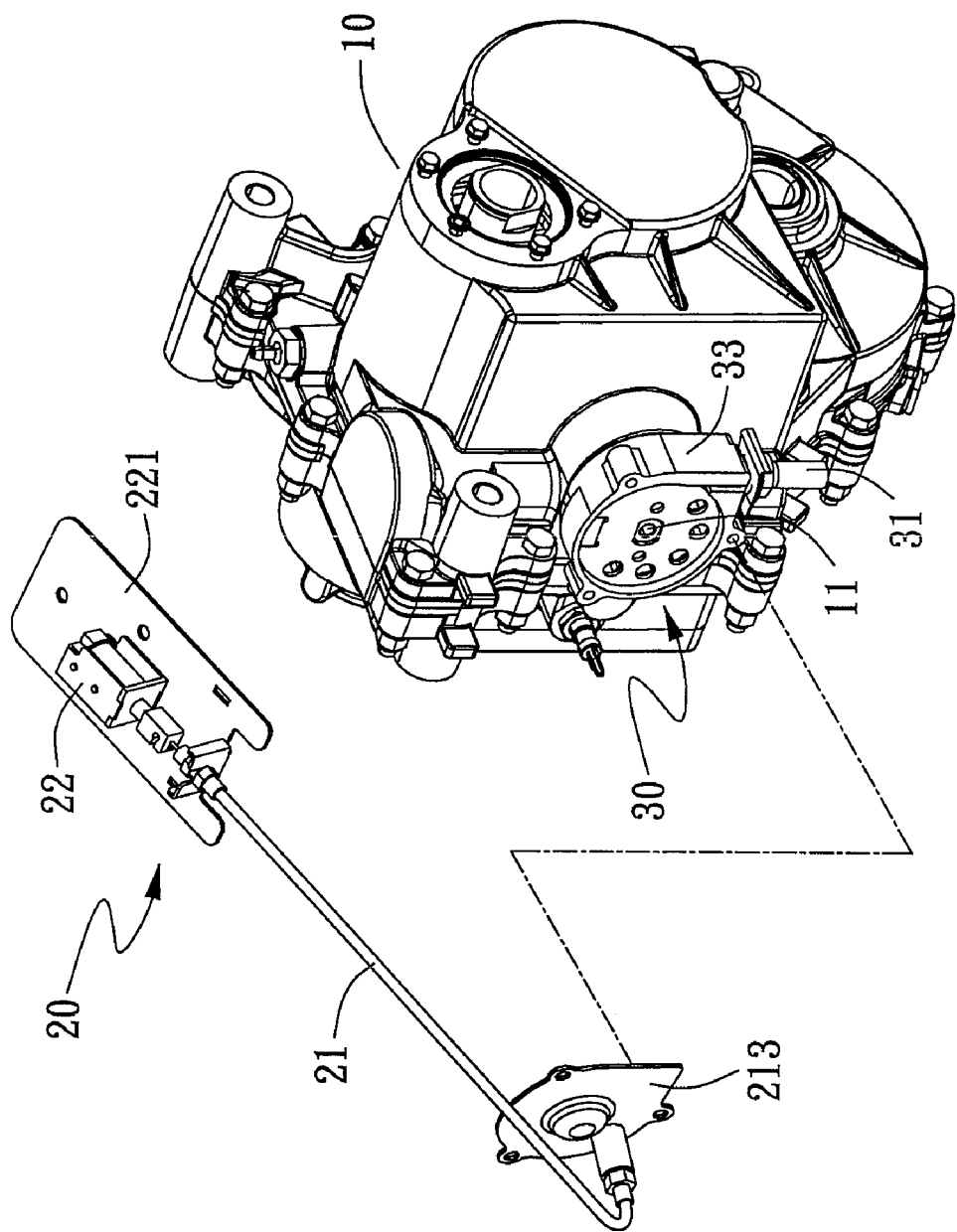
FIG. 1 is a 3-D view of a gearshift lock protection mechanism in accordance with a first preferred example of the present invention.

Before the present invention is described in greater detail, it should be noted that same reference numerals have been used to denote like elements throughout the specification.

Figure 2:
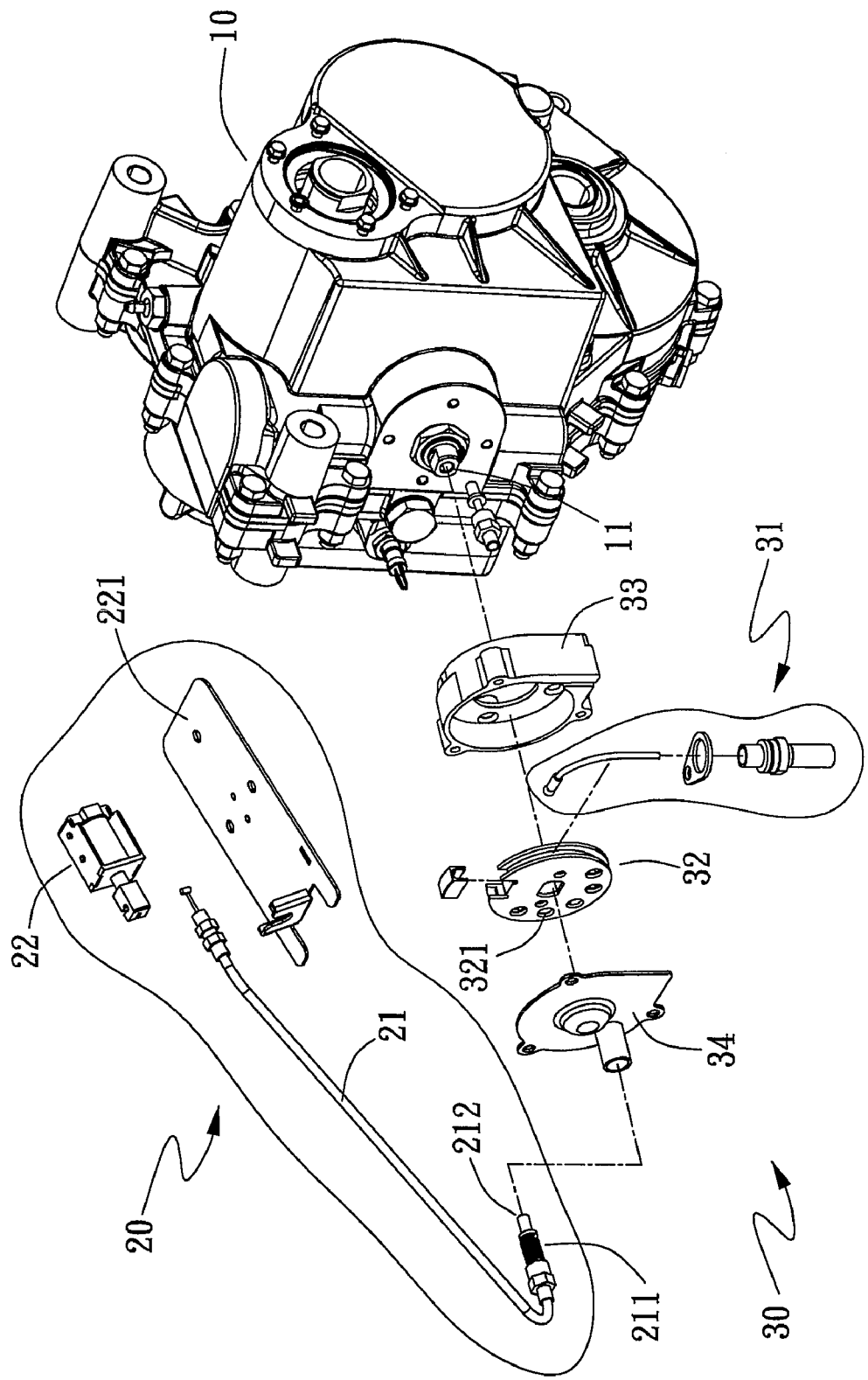
FIG. 2 is an exploded perspective view of a gearshift lock protection mechanism in accordance with a first preferred example of the present invention.

Refer to FIGS. 1-2, a 3-D view and an exploded perspective view of the gearshift lock protection mechanism in accordance with the preferred example of the present invention; a gearshift lock protection mechanism of the present invention comprises a gearbox 10, a gearshift module 30 and a gearshift lock controller 20; the gearshift module 30 comprises a control panel 32 and a gearshift leading wire set 31; the control panel 32 is combined with a gearbox shaft 11 of the gearbox 10; the driver controls the control panel 32 and the movement of the gearbox shaft 11 by gearshift leading wire set 31 which is controlled by the gearshift level (not shown). It should be understood that the gearshift leading wire set 31 may include or may be a Bowden wire. In this way, the driver shifts the gear of the gearbox 10. A plurality of gear ranges positioning holes 321 are located on the surface of the control panel 32 (gearbox 10 has forward, reverse, and neutral gear ranges, and three gear ranges positioning holes 321 are located on the surface of the control panel 32, or, gearbox 10 has five gear ranges which are high speed forward, middle speed forward, low speed forward, reverse and neutral ranges, and, three gear ranges positioning holes 321 are located on the surface of the control panel 32). Gearshift lock controller 20 mainly comprises control valve 22 linked to gearshift positioning lead wire 21, whether the positioning terminal 212 connecting to the end of the gearshift positioning leading wire 21 is in one of the gear ranges positioning holes 321 is determined by the control valve 22. It should be understood that the gearshift positioning lead wire 21 may include or may be a Bowden wire. More specifically, the gearshift module 30 is covered by gearshift leading wire fixed cover 34 and gearshift leading wire fixed base 33, such that the gearshift module 30 is combined with the gearbox 10 by gearshift leading wire fixed base 33 for a more stable combination between the gearbox 10 and the gear shift module 30, and, the gearshift module 30 is combined with the gearshift lock controller 20 by gearshift leading wire fixed cover 34 for a more stable combination between the gearshift lock controller 20 and the gearshift module 30. Moreover, gearshift leading wire fixed cover 34 and gearshift leading wire fixed base 33 also prevent the gearshift module 30 from dust. In addition, control valve 22 could be an electromagnetic valve, and an elastic element 211 is located between the gearshift positioning leading wire 21 and the positioning terminal 212. The control valve 22 (which is electromagnetic valve) controls the compression and the expansion of elastic element 211 to determine whether control positioning terminal 212 is in one of the gear ranges positioning holes 32; wherein, the elastic element 211 is a spring. And, control valve 22 is fixed to the vehicle by control valve fixed panel 221.

Figure 3:
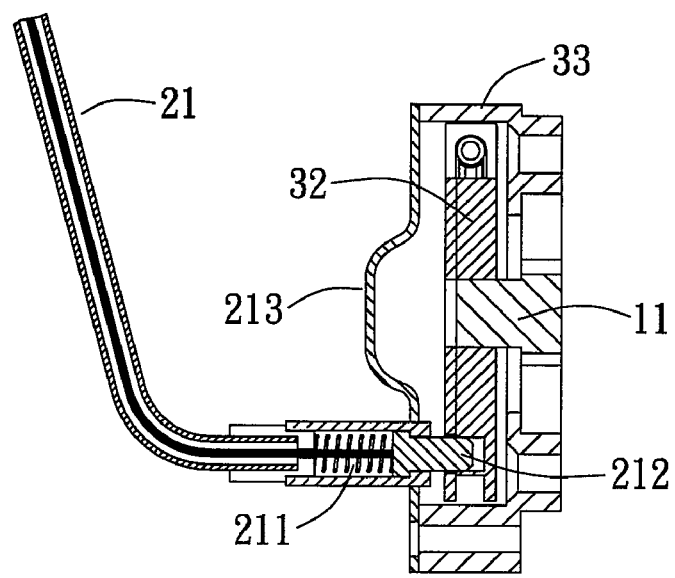
FIG. 3 is a representational side view of the gearshift lock protection mechanism in accordance with the preferred example of the present invention.

Shown in FIG. 3 is a representational side view of the gearshift lock protection mechanism in accordance with the preferred example of the present invention. The control valve 22 controls positioning terminal 212 in the gear ranges positioning holes 321 which are on the surface of the control panel 32, and it prevents the gears from being shifted through control panel 32 while the vehicle is running on high speed. Since the gearbox shaft 11 will not be moved, the gears will not experience accidental shifting. Therefore, damage to the gearbox can be eliminated.

Figure 4:
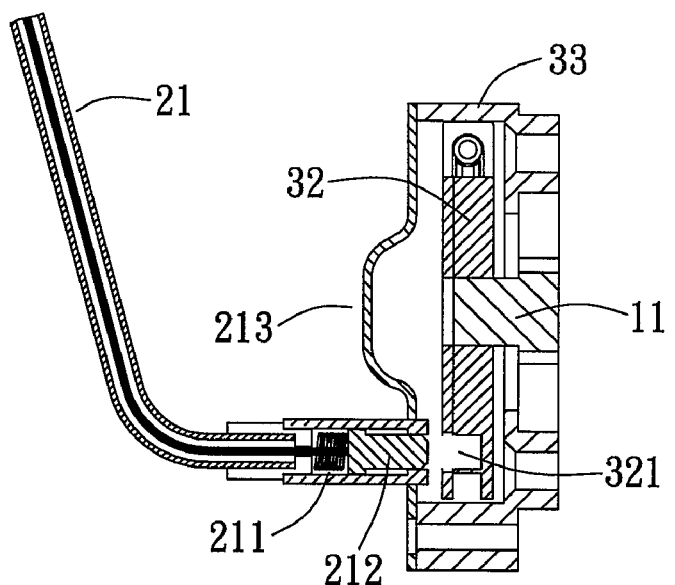
FIG. 4 is a representational side view of the gearshift lock protection mechanism in accordance with the preferred example of the present invention.
Figure 5:
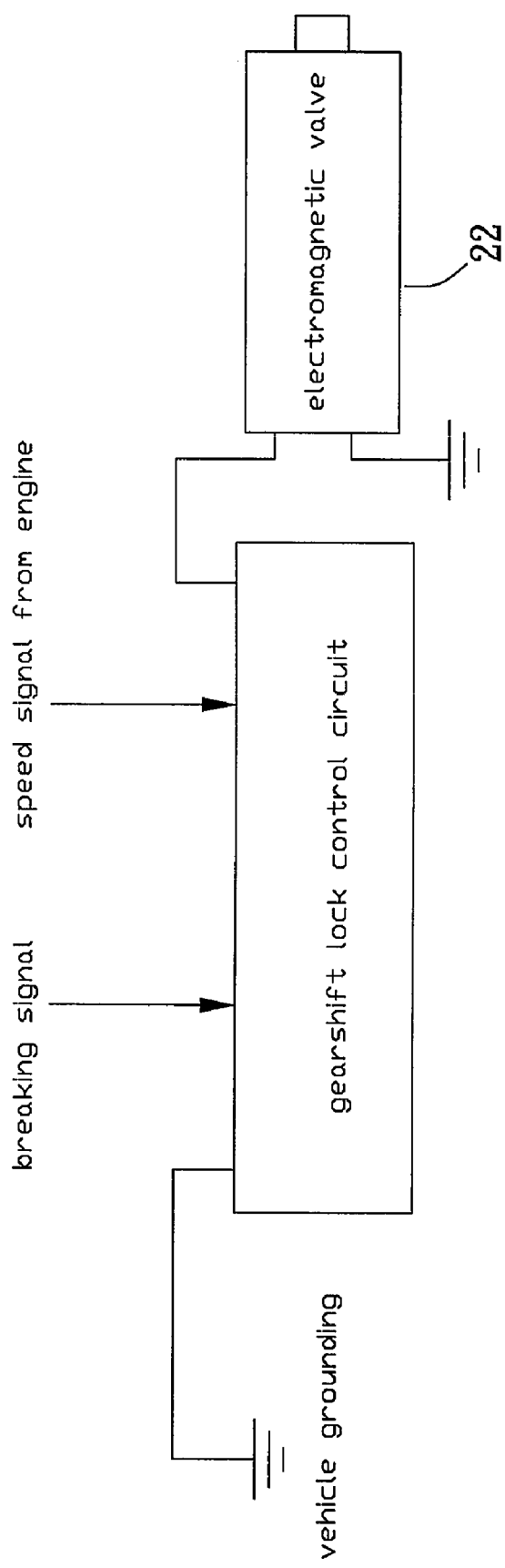
FIG. 5 is a schematic representation of the gearshift lock protection mechanism in accordance with the preferred example of the present invention.

As shown in FIG. 4 and FIG. 5 are the representational side view and the schematic representation of the gearshift lock protection mechanism in accordance with the preferred example of the present invention. Once the control valve 22 receives the low speed signal from engine or the breaking signal, positioning terminal 212 goes through one of the gear ranges positioning holes 321 to lock the gear in a particular range. This further prevents the control panel 32 from being shifted while the vehicle is running at a high speed. With this protection mechanism, when the driver accidentally pushes the gearshift lever, the gearbox will not be shifted simply because the gearbox gearshift shaft 11 is intentionally fixed (or is intentionally locked) to the same position. Therefore, the gearshift lock protection mechanism can eliminate the gearbox damage by locking the gear in a particular range. While eradicating accidental gear shifting, this mechanism, however, will not lock the gear under normal gear shifting process. This can be seen from the fact that the control valve 22 which controls positioning terminal 212 is separated from the gear ranges positioning holes 321 which are on the surface of the control panel 32. It eliminates gearbox damage while shifting gears of the gearbox since the rotational speed of engine is low now, such that, it is a very practical mechanism.

While the present invention has been described in connection with what is considered the most practical and preferred embodiments, it should be understood that this invention is not limited to the disclosed embodiments. It is intended to cover various arrangements included within the spirit and scope of the broadest interpretations and equivalent arrangements.

What is claimed is:

1. A gearshift lock protection mechanism comprising:
   a gearbox having a gearbox shaft extending therefrom;
   a gearshift module comprising:
      a control panel having a plurality of gear ranges positioning holes located on a surface, the control panel in operable communication with the gearbox shaft such that rotation of the control panel about an axis causes rotation of the gearbox shaft about the axis; and
      a gearshift leading wire set controllable by a driver, the gearshift leading wire set configured to rotate the control panel into a plurality of positions corresponding to gears in the gearbox;
   and
   a gearshift lock controller comprising:
      a positioning terminal that is both extendable and compressible, the positioning terminal configured to extend through at least one of the plurality of gear range positioning holes of the control panel such that it locks the particular gear range positioning hole;
      a control valve in operable communication with the positioning terminal and configured to control extension and compression of the positioning terminal into at least one of the plurality of gear range positioning holes; and
      a gearshift positioning leading wire located between the control valve and the positioning terminal.

2. The gearshift lock protection device of claim 1, wherein the control valve is an electromagnetic valve.

3. The gearshift lock protection mechanism of claim 1, wherein an elastic element is located between the gearshift positioning leading wire and the positioning terminal.

4. The gearshift lock protection mechanism of claim 3, wherein the elastic element is a spring.

5. The gearshift lock protection mechanism of claim 1, wherein the gearshift module is covered by a gearshift leading wire fixed cover and a gearshift leading wire fixed base.

* * * * *